M. F. MURPHY.
FLEXIBLE COUPLING.
APPLICATION FILED MAY 24, 1917.
1,369,349.
Patented Feb. 22, 1921.
3 SHEETS—SHEET 1.
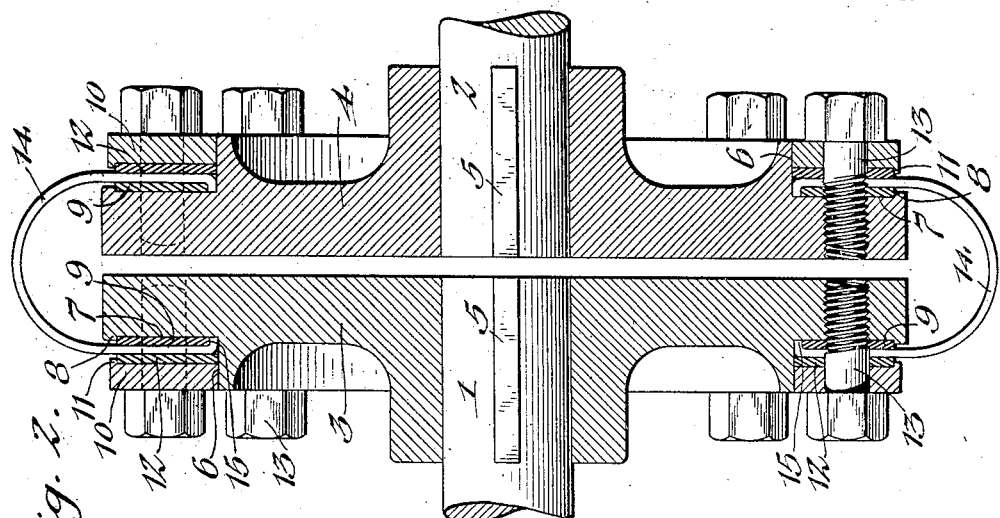
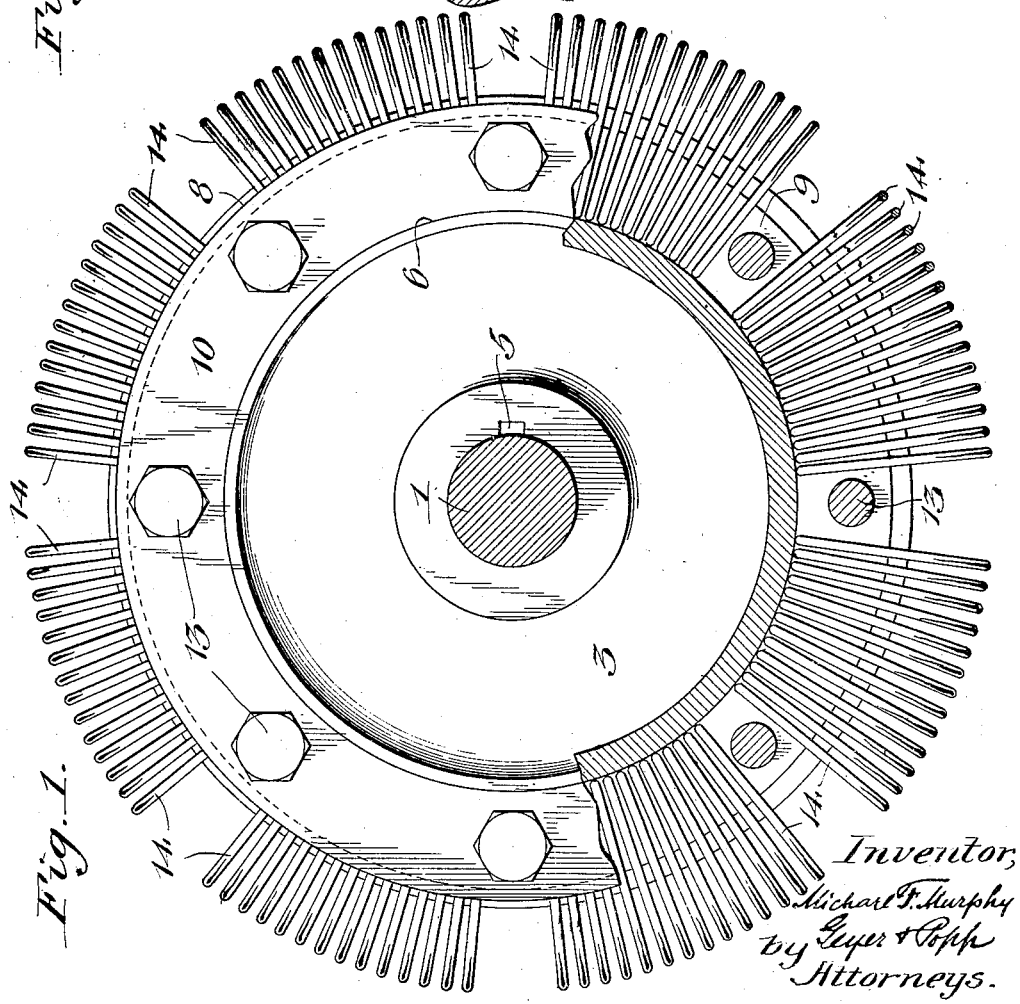
Inventor,
Michael F. Murphy
by Geyer & Popp
Attorneys.

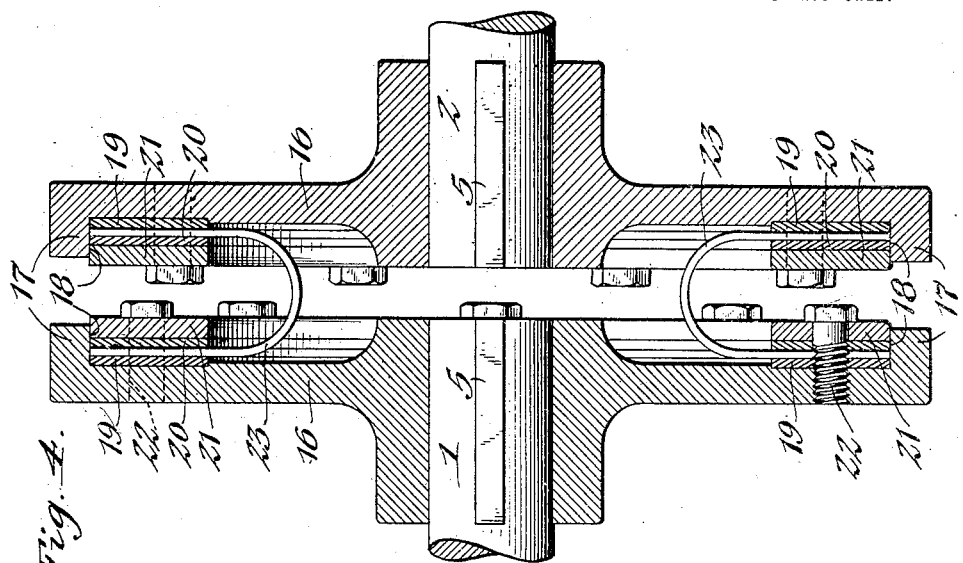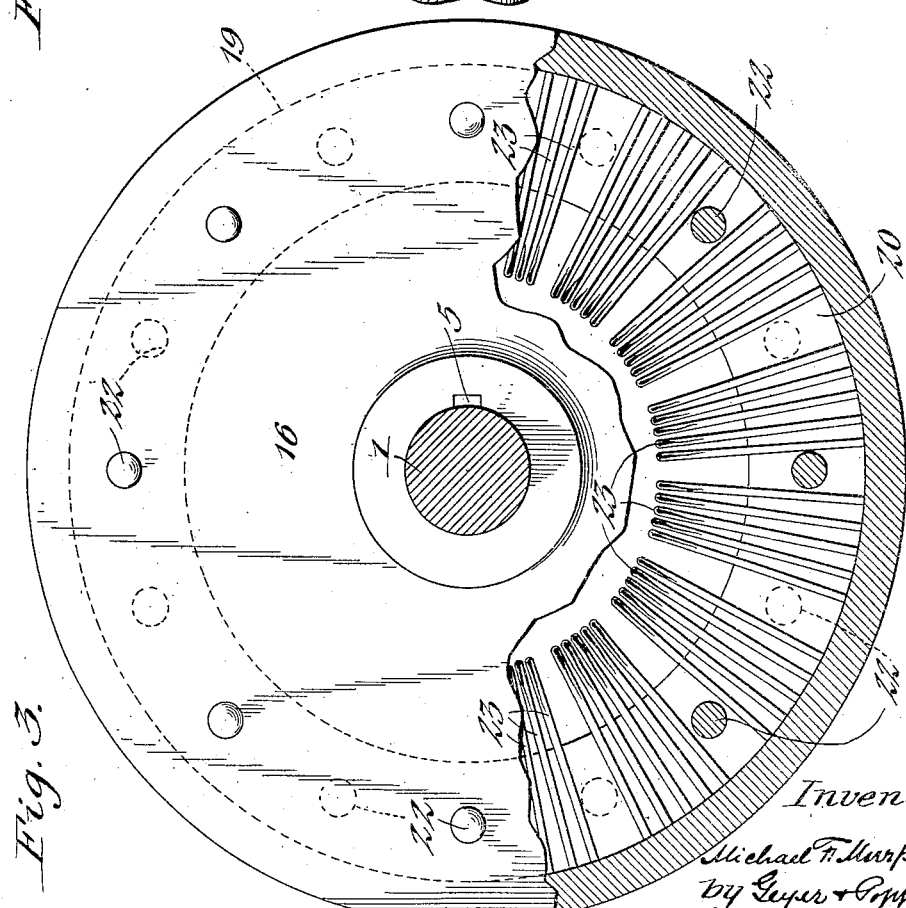

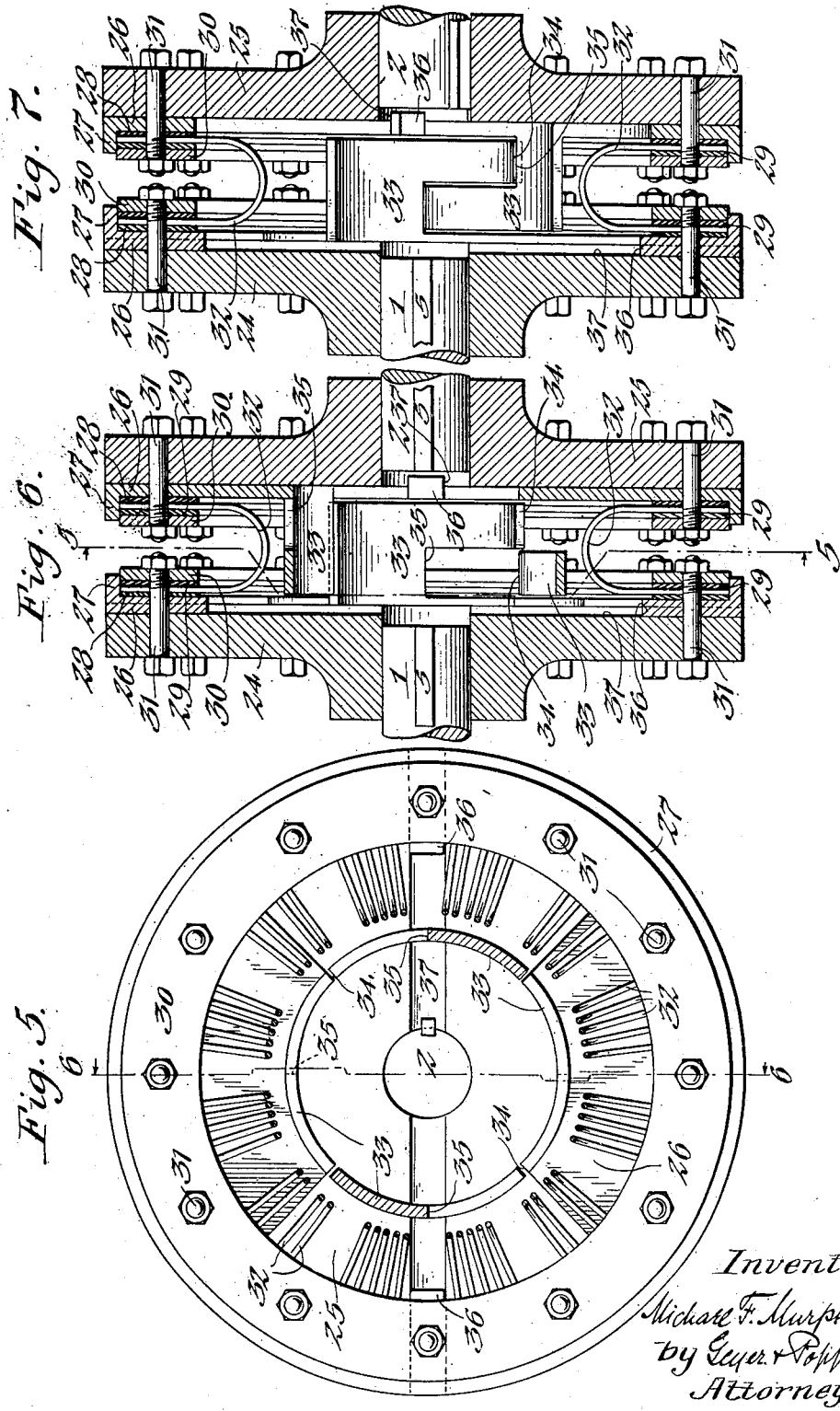

ar part of the radial surface 7, and a flat radial
UNITED STATES PATENT OFFICE.

MICHAEL F. MURPHY, OF BUFFALO, NEW YORK.

FLEXIBLE COUPLING.

1,369,349. Specification of Letters Patent. Patented Feb. 22, 1921.

Application filed May 24, 1917. Serial No. 170,720.

*To all whom it may concern:*

Be it known that I, MICHAEL F. MURPHY, a citizen of the United States, residing at Buffalo, in the county of Erie and State of New York, have invented new and useful Improvements in Flexible Couplings, of which the following is a specification.

In flexible couplings which have been heretofore employed for connecting the opposing ends of two shafts or similar members the spring elements were usually so constructed that the same were not uniformly strained in all circumferential positions relatively to the axis of rotation which is objectionable for the reason that the transmission of the power by this means is not perfectly regular and it also produces different kinds of strains upon the flexible members while arranged in different circumferential positions about the shaft sections which tends to shorten the life of these flexible members and necessitates unduly frequent renewals of the same.

One object of this invention is to provide a flexible coupling of this character which is not only comparatively simple and inexpensive in construction and also capable of being readily assembled and dismembered but which has the further advantage of producing a uniform strain upon the flexible elements in all of the peripheral positions of the same around the shaft sections and thereby not only cause a regular transmission of power from one shaft to the other but also reduce the liability of breakage to a minimum.

Another object is the production of a durable coupling of this kind which is free from parts which are loose or receive frictional wear.

In the accompanying drawings:

Figure 1 is a side elevation, partly in section, of one form of flexible coupling for shaft sections and the like embodying my invention. Fig. 2 is a longitudinal section of the same. Fig. 3 is a side elevation similar to Fig. 1 showing a modified embodiment of my improvements. Fig. 4 is a longitudinal section of the last mentioned construction. Fig. 5 is a transverse section taken on line 5—5, Fig. 6, showing another form of flexible coupling containing my invention. Fig. 6 is a vertical longitudinal section taken on line 6—6, Fig. 5, and showing the parts in one position relatively to each other. Fig. 7 is a section taken on substantially the same line as Fig. 6 showing the parts in a different relative position.

Similar characters of reference indicate corresponding parts throughout the several views.

Referring to Figs. 1 and 2, 1, 2, represent two shaft sections which have their ends opposing each other and which are adapted to be connected by my improved flexible coupling for the purpose of transmitting power from one of these shaft sections to the other. 3, 4 represent two supporting disks or heads constructed of cast iron or similar hard material and secured to the opposing ends of the shaft sections so as to turn therewith, this being accomplished for instance, as shown in Figs. 1 and 2, by means of keys 5 although any other suitable means may be employed which will answer this purpose. On its peripheral part each of the coupling disks is provided on its front side with an annular rabbet forming a cylindrical outwardly facing surface 6 and a flat radial surface 7. At the outer end of the radial surface the same is provided with a laterally projecting rim or rib 8 which forms an inwardly facing annular shoulder on the respective coupling disk.

9, 9 represent rear annular cushioning rings of fiber, copper or similar material which is somewhat softer than the material of which the springs are made. Each of these cushioning rings engages its rear flat side with the flat radial surface 7 on one of the coupling disks while its outer edge bears against the inwardly facing shoulder formed by the rim and its inner edge is separated by an intervening space from the periphery of the cylindrical surface 6 on the respective disk.

10 represents two clamping rings of hard metal such as cast iron or steel and each arranged on the front portion of the cylindrical bearing surface of one of the coupling disks. On the marginal part of each of the clamping rings the same is provided with an annular inwardly projecting rim or rib 11 forming an inwardly facing annular shoulder.

12, 12 represent two front cushioning rings or washers each of which bears with its front side against the radial rear side of the clamping ring and engages its outer edge with the inner side of the rim 11 thereof while its inner edge bears against the cylindrical surface 6 of the respective clamping disk. These front cushioning rings are likewise preferably constructed of fiber, copper or similar material which is somewhat softer than the material of which the springs are made.

Each of the clamping rings is connected with its companion coupling disk by means which preferably comprise a plurality of clamping screws 13 arranged in an annular row and each passing with its body through corresponding openings in the clamping ring and the front and rear cushioning rings while its rear threaded end engages with a threaded opening in the coupling disk and the head at its front end bears against the front side of the clamping ring.

14 represents a plurality of flexible elements whereby the power or movement is transmitted from one of the coupling disks to the other. Each of these flexible elements is constructed substantially in the form of the letter U and preferably of spring steel wire which is round in cross section, but any other suitable resilient material having any other appropriate cross section may be employed. The several flexible coupling elements are arranged in an annular row around the coupling disks and preferably in groups, each group being arranged between two adjacent clamping screws 13, as shown in Fig. 1. Each of the flexible elements has its bow arranged across the outer edges of both coupling disks while each of its legs is clamped between the opposing sides of the two cushion rings 9, 12 of one of the coupling disks. In order to prevent the flexible elements from being thrown outwardly relatively to the coupling disks under centrifugal action the inner end of each leg of the coupling element is provided with a laterally projecting anchoring toe 15 which preferably extends inwardly between the cylindrical face 6 of the respective coupling disk and the inner edge of the companion rear cushion ring 9, as shown in Fig. 2. The thickness of the rear and front cushion rings of each coupling disk is preferably greater than the thickness of the rims 8, 11 on the respective coupling disk and clamping ring, whereby the respective leg of the spring element which is clamped between the companion cushioning rings is held out of engagement from these rims and prevented from becoming worn, thereby prolonging the working efficiency of these spring elements accordingly.

If desired, the flexible coupling containing my invention may be organized in the manner shown in Figs. 3 and 4 in which each of the coupling disks 16, 16 is provided at its outer edge or margin with an annular flange 17 which projects rearwardly toward the flange of the other disk and forms an inwardly facing annular shoulder 18. Each of these coupling disks is provided on its rear side with a front cushion ring 19 engaging its front flat side with the rear side of the respective coupling disk, a rear cushioning ring 20 arranged opposite the front cushioning disk 19 and a clamping ring 21 bearing against the rear side of the rear cushioning ring 20, these several rings bearing at their outer edges against the shoulder 18 of the annular flange 17 of the respective coupling disk. 22 represents a plurality of screws arranged in an annular row and each passing through corresponding openings in the clamping ring 21 and the front and rear cushioning rings and into a threaded opening in the respective coupling disk. Each of the coupling disks 16, 16 and its companion clamping ring are preferably made of cast iron, steel or similar hard material and the cushion rings 19, 20 may be made of fiber, copper or other soft material.

23 represents a plurality of resilient elements or members which are arranged in an annular row between the coupling disks 16, 16 and preferably in groups, each group being arranged between two adjacent clamping screws 22. Each of these spring elements is constructed of spring wires such as steel and has it bow extending across the inner edges of the clamping rings 21 and the rear cushioning rings 20 while its legs are clamped respectively between the front and rear cushioning rings of the two coupling disks 16, 16, as shown in Fig. 4. By this means the spring elements 23 and their fastening means are prevented from becoming displaced when the supporting disks 16, 16 are rotated rapidly while in use.

The modified construction of my invention which is shown in Figs. 5, 6 and 7 is more particularly designed for use with ordinary plain or flat coupling disks such as now generally employed between the ends of the shaft sections and thereby avoid the necessity of any special disks for this purpose, and this construction is also so organized that a positive coupling or clutch effect is produced between the shaft sections when the same are subjected to an overload, thereby preventing the flexible members of this coupling from being unduly strained or broken as would otherwise be liable to occur. This last mentioned embodiment of my invention, is preferably constructed as follows:

24, 25 represent two coupling disks or heads secured to the opposing ends of the shaft sections 1, 2, for instance, in the manner shown in Figs. 1–4, each of these disks having its front and rear radial sides flat or plain.

Between the opposing inner or rear sides of these two coupling disks is arranged a cage which is provided with means for supporting the spring elements of the coupling and also the jaws of the clutch whereby the two shaft sections may be positively coupled in case of an overload. This cage preferably comprises two supporting rings 26, 26 which engage with the marginal parts of the inner or rear faces of the coupling disks, each of these rings being provided at its margin with an inwardly or rearwardly projecting annular flange 27. In rear of each supporting ring is arranged a pair of cushion rings 28, 29 of fiber or similar material both of which engage their peripheries with the annular flange 27 of the respective supporting ring. The front member 28 of this pair engages with the rear side of the supporting ring, while the companion rear member 29 is engaged by a clamping ring 30. The outer or peripheral edge of this last mentioned ring also engages with the flange 27. Each of the supporting rings and the corresponding two cushion rings and clamping ring are detachably secured to the respective coupling disk or head by means of a plurality of bolts 31 which preferably engage their heads with the front or outer side of the coupling disk and their screw nuts with the rear side of the clamping ring, as shown in Figs. 6 and 7. Between the coupling disks is arranged an annular row of U-shaped flexible elements 32, preferably constructed of spring steel wire, each of these spring elements having its bow or cross bar arranged innermost and each of its legs clamped between the cushion rings of one of the coupling disks and engaging its outer end with the flange 27. These spring elements therefore produce a flexible coupling between the shaft sections and operate to yieldingly transmit power from one of the same to the other in a manner described with reference to the construction shown in Figs. 1-4. If at any time one or more of the spring elements should become broken the cage by which the same are mounted on the coupling disks can be easily removed laterally from between the coupling disks without disturbing the latter on their shaft sections and after repairs the parts may be as easily assembled in like manner.

At times an overload is liable to be thrown on the coupling and the springs thereof and in the absence of any provision to prevent, it might therefore become injured or broken. To avoid this, means are provided for positively interlocking the two coupling disks when the same have moved circumferentially one relatively to the other to a predetermined limit, thereby avoiding undue strain or flexing of the spring elements and preventing injury or breaking of the same. In the preferred construction shown in the drawings for accomplishing this purpose each of the supporting rings 26 is provided on its inner edge and on diametrically opposite sides of its axis with two segment-shaped clutch jaws 33 each of which is of substantially L-shaped form and provided with a front stop 34 which is spaced apart from the supporting ring and a rear stop 35 which is arranged adjacent to the supporting ring but at a distance circumferentially from the front stop. In the assembled position of the parts the front stops of the coupling jaws of each supporting disk are circumferentially in line with the rear stops of the clutch jaws of the supporting ring of the other coupling disk. Under normal loads the front and rear stops of the clutch jaws of each coupling disk are separated circumferentially from the corresponding stops of the other coupling disk, as shown in Figs. 5 and 6, so that the spring elements serve as the sole means for transmitting power yieldingly from one shaft section to the other. But if one of these shaft sections should be turned to the predetermined limit relatively to the other shaft section then the front stops of the clutch jaws of each coupling disk will engage with the rear stops of the clutch jaws of the other coupling disk, as shown in Fig. 7, whereby the two coupling disks will become interlocked in the manner of a clutch and thereafter transmit power positively from one shaft to another. By this means an overload on the spring members of the flexible coupling is avoided and injury or breakage of the same is prevented. As soon, however, as the overload is removed the resilience of the spring elements causes the clutch jaws to be again moved circumferentially away from each other, so that their coöperating stops do not abut against each other, whereby the yielding transmission of power from one shaft to the other is resumed.

In order to insure bringing the supporting rings into their proper relative position on the coupling disks, so that the coöperating stop shoulders of their clutch jaws will engage before the overload injuriously affects the spring elements, each of these supporting rings is provided on its outer or front side with a plurality of radial tongues or tenons 36 which engage with radial grooves 37 formed on the rear face of the respective coupling disk. The tongues and grooves of one coupling disk are preferably arranged at right angles to those of the other coupling disks, as shown in the drawings, and when the parts are assembled these tongues also serve to compel these supporting rings to turn with the coupling disks and thereby relieve the coupling bolts of shearing strains. In the several constructions of my improved flexible coupling the resilient connection between the relatively rotating members of the same is effected by means of a plurality of spring elements each of which is of substantially round or wire-shaped form in cross section so that the same is free to twist in all directions and offer a uniform yielding resistance to such displacement in any direction in which the same may be flexed. It follows from this that a transmission of power from one shaft section to the other is uniform at all times and that the possibility of breakage of the spring elements is by this means reduced to a minimum, this being a very important item inasmuch as a break down in a flexible coupling often necessitates shutting down a considerable part of a plant and therefore involves considerable loss in time and output.

Furthermore, this flexible coupling is very light for the amount of power which the same is able to transmit and the same can be very readily assembled and also dismembered for the purposes of inspection or displacement of any of its parts.

The coupling, moreover, has no parts which are loose or subject to wear from friction, thus producing a very durable and reliable construction.

I claim as my invention:

1. A flexible coupling comprising two supporting members adapted to be connected to the parts to be coupled, and a plurality of U-shaped spring wires arranged in an annular row relatively to said members and each wire having its legs connected respectively with said members and arranged radially relatively thereto, and each wire being of substantially round form in cross section throughout the length of the wire.

2. A flexible coupling comprising two supporting members adapted to be connected to the parts to be coupled, a plurality of spring elements connected with said supporting members, and cushioning members interposed between said supporting members and said spring elements, and each spring element being U-shaped and of substantially round form in cross section.

3. A flexible coupling comprising two supporting disks each of which is provided with an inwardly facing annular shoulder, cushioning rings arranged on said disks and engaging said shoulders, and a plurality of U-shaped spring wires connected with said disk and engaging with said rings.

4. A flexible coupling comprising two supporting disks, a pair of cushioning rings arranged on each disk, a plurality of U-shaped spring wires each having one of its legs arranged between the cushioning rings of one of said disks, and means for clamping said cushioning disks against opposite sides of the legs of the spring wires and connecting the same with said disks.

5. A flexible coupling comprising two supporting disks, a pair of cushioning rings associated with each disk, means for mounting each pair of cushion rings on its companion disk, and U-shaped wires having their legs clamped respectively between the pairs of cushioning rings of both disks.

6. A flexible coupling comprising two disks, two supporting rings mounted on said disks, respectively, and each provided on its inner side with an annular flange, and a plurality of U-shaped springs secured with their legs respectively to said supporting rings and each having its bow innermost and the ends of its legs bearing radially outward against said flanges.

7. A flexible coupling comprising two disks, two supporting rings mounted on said disks, respectively, and each provided on its inner side with an annular flange, a plurality of U-shaped springs secured with their legs respectively to said supporting rings and each having its bow innermost and the ends of its legs bearing radially outward against said flanges, front and rear cushion rings engaging with the opposite sides of the corresponding legs of said springs, the front cushion rings engaging with said supporting rings, respectively, clamping rings engaging with the rear cushion rings, and bolts connecting each coupling disk and the corresponding supporting cushion and clamping rings.

8. A flexible coupling comprising two coupling disks, springs connecting said disks, clutch jaws mounted on said disks and each being of L-shape and provided with a front stop and a rear stop and the front stop of each jaw on one disk being circumferentially in line with the rear stop of a jaw on the other disk, a supporting ring arranged on each disk and carrying the corresponding clutch jaws and said disks and rings being provided with complementary interlocking grooves and tongues.

MICHAEL F. MURPHY.